Patented June 14, 1927.

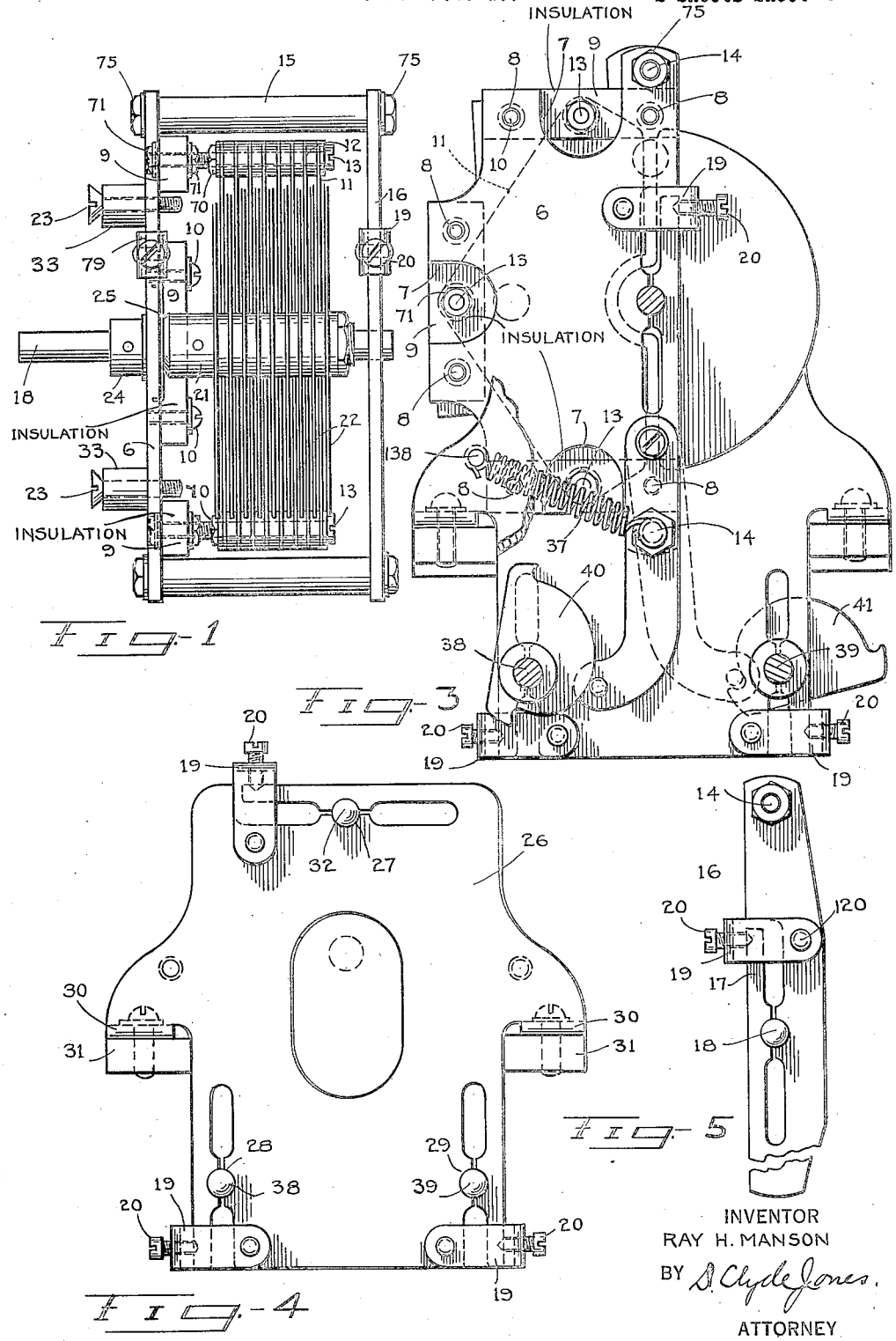

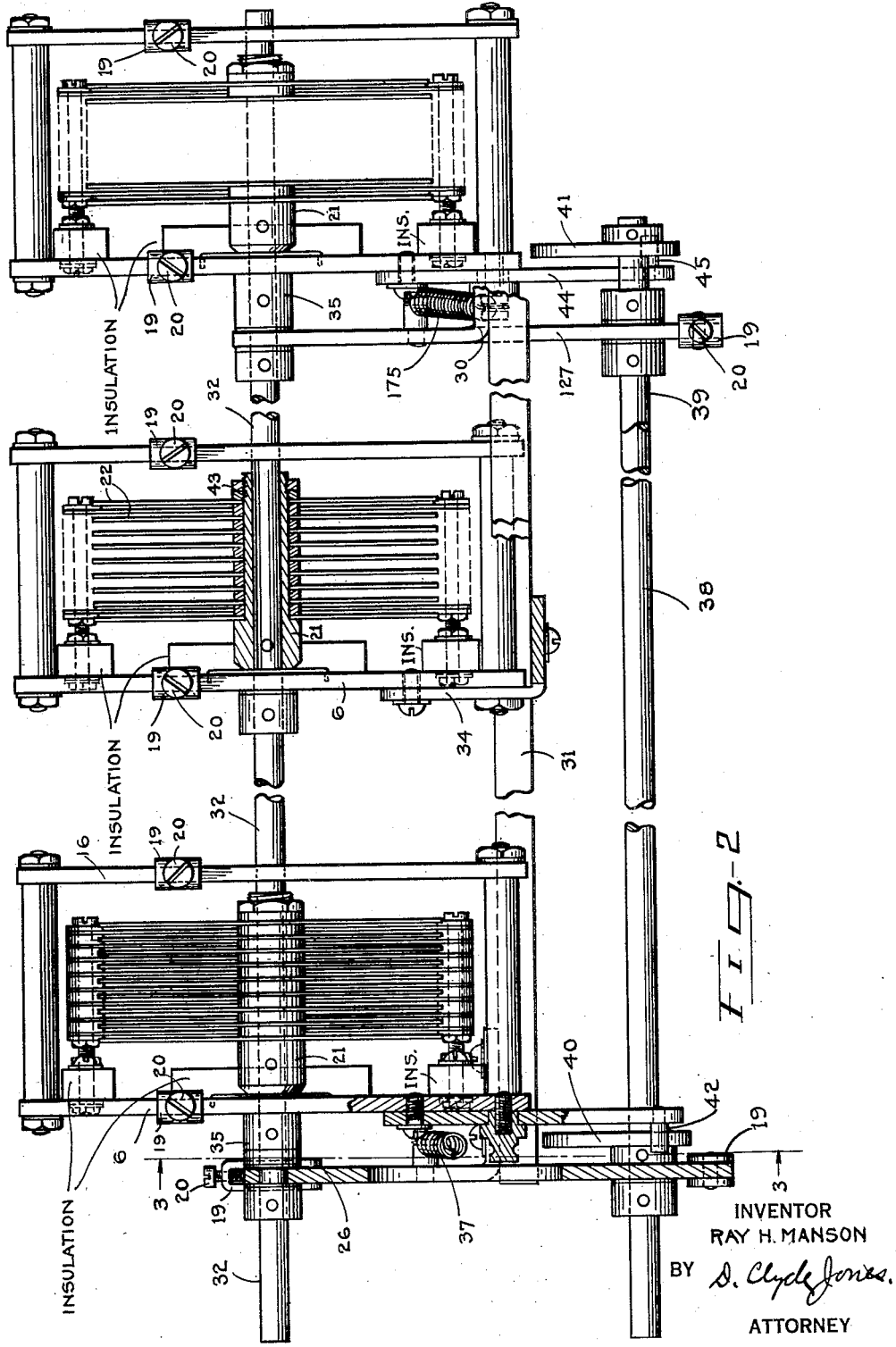

1,632,487

UNITED STATES PATENT OFFICE.

RAY H. MANSON, OF ROCHESTER, NEW YORK, ASSIGNOR TO THE STROMBERG-CARLSON TELEPHONE MANUFACTURING COMPANY, OF ROCHESTER, NEW YORK, A CORPORATION OF NEW YORK.

VARIABLE CONDENSER.

Application filed February 16, 1924. Serial No. 693,382.

This invention relates to variable electrical condensers.

It is the purpose of the present invention to provide an electrical condenser which is efficient electrically, sturdy mechanically, as well as simple to manufacture and capable of accurate adjustment.

One of the features of this invention resides in the arrangement of parts whereby the rotors of several condenser units may be mounted on a common shaft for simultaneous adjustment.

Another feature of this invention resides in the provision of means whereby the so-called stator elements of a variable condenser may have limited movement with respect to the so-called rotor elements, so that limited adjustments of said stator elements may be effected.

A further feature of the invention relates to the novel arrangement of parts in a variable condenser whereby the metal in contact with the insulation is reduced to a minimum and whereby the insulation is so placed that it is not in a strong direct field or stray field from the condenser proper.

Additional features such as the mounting of the stator elements on the frame will appear from the description.

In the drawing, Fig. 1 represents a top view of a single variable condenser which is herein referred to as a condenser unit. In this view certain of the rotor plates have been broken away to more clearly disclose the arrangement of parts.

Fig. 2 represents a side view of a multi-unit variable condenser, with certain of its parts broken away for clearness in description.

Fig. 3 is a sectional view on the line 3—3 of the condenser of Fig. 2, with certain parts broken away.

Fig. 4 is a front view of a frame upright of the condenser of Fig. 2, with all parts at the right of line 3—3 omitted.

Fig. 5 is a detail view of the rear frame member of the condenser of Fig. 1, which frame member also appears in each of the units of Fig. 2.

Referring to the condenser unit of Fig. 1, 6 represents a front view of a frame member, the outline of which is shown in Fig. 3. This frame member has cut-out portions 7, and pairs of threaded holes 8 on three of its sides as shown in Fig. 3. Three blocks 9 of insulating material, preferably of hard rubber, are supported across the openings 7 by means of screws such as 10, passing through openings in the pieces of insulation and through the threaded holes 8 in the frame. A stator unit consisting of a plurality of thin metallic plates 11, of substantially the outline indicated at 11 in dotted lines in Fig. 3 and separated by spacers such as 12, is mounted on member 6 by means of bolts 13. The spacers and plates are clamped in assembled relation on bolts 13 by nuts 70. The bolts 13, are each of sufficient length to pass through an opening in the block of insulation 9 and are held in this position by nuts 71 and spring washers threaded on the bolt 13 to engage each side of the block of insulation. By this arrangement the stator unit can be adjusted, within small limits, toward and away from the front member 6 to compensate for variations in manufacture. At the top and at either end of the frame member 6, there is provided a threaded opening to receive a threaded stud such as 14, to serve as a support for the rear frame 16. Suitable nuts 75 and spring washers threaded on each stud 14, hold this frame member in fixed relation with respect to the front frame member 6.

Each of the members 6 and 16, is provided with a spring bearing, best shown in Fig. 5. This bearing is formed by cutting an elongated opening in the frame member such as 16 to provide a long spring element 17. At a point intermediate of the length of this element, there is a cut-out portion which with a similar cut-out portion in the main part of member 16, defines a circular opening to receive a shaft such as 18. A saddle U-shaped in form and secured to the frame 16 by a pin 120, holds the spring element 17 against lateral movement. This saddle has a threaded aperture to receive a screw 20, by which the relation between the spring element 17 and the main portion of the frame 16 is adjusted. By this means when the shaft 18 becomes loose in the bearing, the screw 20 may be adjusted to force the spring element 17 toward the main portion of the frame and thereby tighten the bearing and prevent any "shake" or looseness.

On the shaft 18 there is keyed a hollow member 21 shown in section in Fig. 2, provided with a shoulder and a body portion on which a series of rotor plates 22, separated by spacers are mounted and are held in fixed relation by one or more nuts 43. A collar 24 pinned to the shaft 18, tends to prevent any longitudinal movement in one direction of the rotor element during rotation, while a leaf spring 25 together with the member 21, holds or maintains the rotor element in a definite longitudinal position. From the foregoing it will be seen that the bearing in which the shaft 18 is mounted is so designed that it tends to prevent any radial or longitudinal movement, due to improper bearings.

From the foregoing description it will be seen that the stator element is supported from one frame member only. Likewise the collar 24, spring 25 and support 21 for the rotor plates take all of the thrust on this same frame member 6. In this way the parts that are subject to variations are mounted on one frame member only. It should be mentioned that the stator element has a variable three point support by which this element may be so adjusted that the rotor plates and the stator plates can be adjusted to occupy parallel planes. Screws 23 and spacers 33 serve as means to secure the condenser to a panel or other support. It should further be noted that the blocks of insulation 9, supported across the cut-out portions 7, are so arranged that the amount of metal in contact with the insulation is reduced to a minimum and these blocks are also placed so that they are not in a strong direct field or stray field from the condenser proper.

In the modified form of the invention shown in Figures 2, 3 and 4, a plurality of so-called stator elements are mounted in parallel relation and an equal number of rotor elements are mounted on a common shaft for cooperation with these stator elements. These elements are mounted in a frame consisting of a front upright 26 and a rear upright 127, provided with brackets 30, to which side bars 31 are secured to hold the uprights in spaced relation. The uprights are provided with three spring bearings 27, 28 and 29, similar to that previously described, in which shafts 32, 38 and 39 are mounted for rotation. On shaft 32 there are secured by keys or pins, several rotor elements of which three are shown. Each of these rotor elements consists of a series of rotor plates 22, separated by spacers all mounted on a member 21, and then clamped in fixed relation by a nut 43 engaging the member 21.

The stator elements of this condenser are substantially similar to that shown in Fig. 1, except that the screws 23, and collars 33 have been omitted. The middle stator element is secured to the main frame by a bracket 34, fastened at one end to the frame 6 and at its other end secured to the side bars 31 of the frame. The stator elements of the condenser units appearing on either end of the condenser, are mounted for limited rotary movement. To achieve this result the stator element including the front and rear members 6 and 16 with its spaced plates are supported for rotation on the shaft 32. Keyed collars 21 and 35 prevent movement of these elements longitudinally of the shaft 32. In the case of the stator element shown at the left of this frame, a spiral spring 37 secured at one end to the frame 6 and at its other end to a lug 138 on the upright 26, tends to rotate the stator element in a clockwise direction. On the shaft 38 previously mentioned, there is provided a cam 40, while on the shaft 39 there is mounted a cam 41. An arm secured to the frame 6 of the stator element at the left of Fig. 2 carries a hardened steel pin 42, which engages the surface of the cam 40 and as the shaft 38 is rotated in a clockwise direction, the stator element of this under the action of the spring 37, is rotated in a counter-clockwise direction. On the frame of the stator element at the extreme right of Fig. 2 there is provided an arm 44 carrying a hardened steel pin 45, which engages the surface of the cam 41 and when the shaft 39 is rotated in a clockwise direction the stator frame is rotated in a counter-clockwise direction by spring 175.

While the multi-unit condenser of Fig. 2 is not limited to any one use, it is particularly useful in multi-stage radio receiving circuits of the type similar to that disclosed in Fig. 9 on page 12, of the magazine Q. S. T., for April 19, 1923. The three variable condensers shown in this last mentioned diagram, correspond to the three condenser units as shown in Fig. 2 of this disclosure.

What I claim is:

1. In a multi-unit variable condenser, a frame having a plurality of pairs of bearings, a shaft rotatable in one of said pairs of bearings, a plurality of rotor units secured in spaced relation on said shaft, a stator unit secured to said frame in electrical relation to one of said rotor units, a second stator unit movable on said shaft in electrical relation to a second rotor unit, a second shaft movable in a second pair of said bearings for moving said second stator unit to vary the electrical relation between it and its associated rotor unit, and saddles secured to said frame for varying the adjustment of at least one pair of said bearings.

2. In an article of the class described, a frame including spaced uprights having bearings, a shaft rotatable in certain of said bearings, a plurality of rotor units secured in spaced relation on said shaft, a stator unit secured to said frame in electrical relation to one of said rotor units, a second stator unit rotatable on said shaft in electrical relation to a second rotor unit, said last mentioned stator unit being insulated from said rotor unit but being movable for variably changing the relation between it and its associated rotor unit, a second shaft mounted in certain of the bearings of said uprights, a cam secured on said last mentioned shaft, an arm secured to said last mentioned stator unit and having a portion in engagement with said cam, and means tending to hold said arm in engagement with said cam.

3. In an electrical condenser, a front frame element having cut-out portions and a spring bearing, a stator unit consisting of a plurality of spaced metallic plates held in conductive relation, blocks of insulation mounted across the cut-out portions of said frame element, means for securing said stator unit to said blocks of insulation, a rear frame element secured in spaced relation to said front frame element, said rear frame element being provided with a spring bearing, a shaft rotatably mounted in the spring bearings of said frame elements, a rotor element consisting of a plurality of metallic plates in conductive relation and spaced so that certain of the plates of the rotor unit may be rotated between the plates of said stator unit, and a saddle secured to each of said frame elements for varying the adjustment of said spring bearings.

4. In a variable condenser, a stator unit consisting of a plurality of spaced metallic plates in conductive relation, a rotor unit consisting of a plurality of spaced plates also in conductive relation, means for mounting said rotor unit for rotation in electrical relation with said stator unit, an arm secured to said stator unit, and means including a spring for directly rotating said arm.

5. In an article of the class described, a frame including spaced uprights having spring bearings, a shaft rotatable in said spring bearings, a rotor unit secured to said shaft, a stator unit rotatable on said shaft in electrical relation to said rotor unit, an arm secured to said stator unit, a spring tending to rotate said arm in one direction, and adjustable means for causing said arm to rotate in a contrary direction against the action of said spring.

6. In an article of the class described, a frame including spaced uprights having spring bearings, a shaft rotatable in said bearings, a rotor unit secured to said shaft, a stator unit rotatable on said shaft in electrical relation to said rotor unit, an arm secured to said stator unit, a spring tending to rotate said arm in one direction, adjustable means for rotating said arm in a contrary direction against the action of said spring, and a saddle member on each upright for varying the adjustment of said spring bearings.

7. In an electrical condenser, a frame consisting of a pair of spaced front and rear members, each provided with a spring bearing, a stator unit consisting of a plurality of spaced metallic plates held in conductive relation, blocks of insulating material for mounting said stator unit insulatingly on said frame, a shaft of conducting material rotatively mounted in said spring bearings, a rotor element consisting of a plurality of metal plates conductively mounted on said shaft and spaced so that certain of the plates of the rotor unit may be rotated between the plates of said stator unit, and a saddle secured to each of said frame members for varying the adjustment of said spring bearings.

8. In an article of the class described, a frame including spaced uprights having bearings, a shaft rotatable in certain of said bearings, a plurality of rotor units secured in a spaced relation on said shaft, a stator unit associated in electrical relation with each one of said rotor units, an arm secured to one of said stator units, and means including a spring and an adjustable member for directly rotating said last-mentioned stator unit by means of said arm.

9. In a variable condenser, a support, a stator unit mounted on said support, said stator unit consisting of a plurality of spaced metallic plates in conductive relation, a shaft rotatively mounted in said support, a rotor unit secured to said shaft, said rotor unit consisting of a plurality of spaced plates secured to a hollow sleeve, said shaft passing through said sleeve and secured thereto, and spring controlled means for rotating said stator unit with respect to said rotor unit.

10. In an article of the class described, in combination, a support, a plurality of stator units mounted on said support, a plurality of rotor units, a shaft for moving said rotor units simultaneously into variable electrical relation to said stator units, each rotor unit consisting of a plurality of spaced metallic plates secured to a hollow sleeve, said shaft passing through said hollow sleeves and being secured to said sleeves, and cam-actuated means for moving one of said stator units with respect to its associated rotor unit.

11. In a multi-unit condenser, a frame, a main shaft rotatably mounted in said frame, a plurality of rotor units mounted on said main shaft, each rotor unit comprising a plurality of metal plates in conducting relation secured to said main shaft, a stator unit associated with each rotor unit, each stator unit consisting of a plurality of spaced metal plates in conducting relation, a second shaft mounted at a distance from the main shaft and provided with a cam member, and a second cam member mounted on one of said stator units and cooperating with said first cam member, whereby said second shaft effects rotation of said last mentioned stator unit.

12. In a multi-unit condenser, a support, a main shaft rotatably mounted in said support, a plurality of rotor units, each rotor unit consisting of a plurality of spaced metal plates in conducting relation mounted on said main shaft, a stator unit associated with each rotor unit, each stator unit consisting of a plurality of spaced metal plates electrically connected together, but insulated from the other stator unit, a movable member remote from said main shaft and provided with a cam element, and a second cam element connected to one of said stator units and cooperating with said first cam element whereby said member effects rotation of one of said stator units.

13. In a multi-unit condenser, a plurality of rotor units mounted on a single main shaft, stator units in electrical relation with said rotor units, one of said stator units being rotatably mounted, a second shaft having a different axis of rotation from said main shaft, and cooperating cam members on said second shaft and said rotatable stator unit, whereby movement of said second shaft effects rotation of said last mentioned stator unit.

In witness whereof, I hereunto subscribe my name this 11th day of February, A. D. 1924.

RAY H. MANSON.

CERTIFICATE OF CORRECTION.

Patent No. 1,632,487.  Granted June 14, 1927, to

RAY H. MANSON.

It is hereby certified that error appears in the printed specification of the above numbered patent requiring correction as follows: Page 2, line 87, after the word "this" insert the word "unit"; page 3, line 26, claim 3, for the word "conductive" read "conducting"; and that the said Letters Patent should be read with these corrections therein that the same may conform to the record of the case in the Patent Office.

Signed and sealed this 2nd day of August, A. D. 1927.

Seal.

M. J. Moore,
Acting Commissioner of Patents.